US006639167B1

(12) United States Patent
Björk

(10) Patent No.: US 6,639,167 B1
(45) Date of Patent: Oct. 28, 2003

(54) DEVICE AND METHOD FOR PELLET SORTING

(75) Inventor: Svante Björk, Kungsbacka (SE)

(73) Assignee: Svante Bjork AB, Kungsbacka (SE)

( * ) Notice: Subject to any disclaimer, the term of this patent is extended or adjusted under 35 U.S.C. 154(b) by 0 days.

(21) Appl. No.: 09/581,389

(22) PCT Filed: Jan. 4, 1999

(86) PCT No.: PCT/SE99/00002

§ 371 (c)(1),
(2), (4) Date: Jun. 13, 2000

(87) PCT Pub. No.: WO99/37412

PCT Pub. Date: Jul. 29, 1999

(30) Foreign Application Priority Data

Jan. 9, 1998 (SE) .............................................. 9800030

(51) Int. Cl.[7] ............................ B07C 5/00; B65G 25/00

(52) U.S. Cl. ....................... 209/587; 209/639; 209/920; 209/939; 198/751

(58) Field of Search ................................ 209/576, 577, 209/587, 639, 920, 939; 198/502.4, 750.1, 751

(56) References Cited

U.S. PATENT DOCUMENTS 3,834,534 A * 9/1974 Peterson et al. ........ 198/751 X
4,848,590 A * 7/1989 Kelly ..................... 209/639 X
5,236,092 A * 8/1993 Krotkov et al. ......... 209/920 X
5,538,142 A 7/1996 Davis et al. ............ 209/587 X
5,555,984 A * 9/1996 Sommer, Jr. et al. ... 209/587 X
5,669,511 A * 9/1997 Satake et al. ........... 209/587 X
6,040,544 A * 3/2000 Schantz et al. ............. 209/577
6,265,683 B1 * 7/2001 Flottmann et al. ...... 209/587 X

FOREIGN PATENT DOCUMENTS

DE 1817153 8/1969
DE 2950950 7/1980
EP 0705650 4/1996
FR 2668962 * 5/1992 ................. 209/639

* cited by examiner

*Primary Examiner*—Tuan N. Nguyen
(74) *Attorney, Agent, or Firm*—Samuels, Gauthier & Stevens, LLP

(57) ABSTRACT

The invention relates to an arrangement for sorting pellets (2), that includes a transportation device (3) for feeding the pellet (2), a first container (8) for faultless pellets (2*a*) fed over the end portion of the transportation device (3), a second container (13) for defective pellets (2*b*), a detector (9) for detecting defective pellets (2*b*) and a sorting device (11) for feeding any defective pellets (2*b*) detected to the second container (13). The invention is characterised in that the transportation device (3) is arranged with an angle of inclination (α) relative to the horizontal plane which is selected within a predetermined interval corresponding to a predetermined, limited scattering of the trajectory of the faultless pellets (2*a*) fed over the end portion of the transportation device (3). The invention also relates to a method for such a sorting. Thanks to the invention, an improved sorting with an even and controlled flow of pellet and a high capacity is provided.

13 Claims, 2 Drawing Sheets

DEVICE AND METHOD FOR PELLET SORTING

TECHNICAL FIELD

The present invention relates to a device for sorting pellets in accordance with the preamble of the appended claim 1. The invention is particularly intended for use in connection with sorting of synthetic material pellets, for detecting any defective pellets and for sorting out such defective pellets. The invention also relates to a method for such sorting of pellets in accordance with the preamble of the appended claim 7.

BACKGROUND ART

When manufacturing electrical cables for high and medium high tensions, preferably of the order of 50 kV and upwards, one or more electrical conductors are normally provided with a semi-conductive layer and a surrounding insulation coating. In this context it is previously known to use a particular type of oil-cooled paper insulation for the production of this insulation coating. However, in the most recent years, synthetic materials, preferably polythene, have become increasingly common for producing this coating. This choice of material entails certain advantages compared to the previous oil-cooled paper insulation, a/o with regard to maintenance, service and service life. Furthermore, the polythene insulation is a more environment-friendly material than the paper insulation.

Regarding the insulation material for electrical cables, there exists a desire to provide it with as high a temperature resistance as possible. This would in turn warrant, that the insulation coating does not run the risk of melting during any short circuiting currents in such a cable. In connection with medium and high tension cables, it is furthermore of great importance that there is no contamination in the insulating polythene coating, as this could lead to electrical disruption in the cable. Such disruptions can in turn lead to destruction of the cable. When manufacturing the insulating polythene coating, it is however previously known that certain inhomogenities, i.e. contamination, may occur in the material. Such defects could spread with time in the insulation material and cause electrical disruption in a cable.

For the above reasons, there are very stringent demands in the manufacture of cables for medium and high tension, on the purity of the raw material being used for the insulating polytene coating of the cable. This raw material normally consists of pellets, i.e. balls or grains, of polythene. In order to satisfy these stringent purity demands, a fault check is commonly made on this pellet in connection with cable manufacturing. In this manner, those pellets containing any form of defect (i.e. in the form of air bubbles, contamination, deviating symmetry, deviating colour, etc) can be sorted out, as they might otherwise cause the above problems in the finished cable.

According to the known art, there are various methods and devices for sorting pellets. One previously known method is based on using a smaller amount of pellet for manufacturing of a thin film, whereupon this film would be checked through feeding in under a detection device comprising a camera, which in turn detects any defects in the film. If defects are found, the position of these defects can be indicated automatically on the film.

Although this known method generally functions satisfactorily, it has a disadvantage in only being a statistical detection method, by which only a small fraction of the pellets are checked. As the pellet is used to manufacture a film, certain specific pellets cannot be sorted out in this process.

In order to solve the above problem, there is a previously known method in which the raw material, i.e. the pellets themselves, is checked. If all pellets within a manufacturing process could be checked regarding purity, this would create possibilities of purifying the raw material to 100%, which would allow an extremely high purity when manufacturing the insulation coating of an electrical cable.

A previously known arrangement of the last-mentioned type, for sorting the pellet, comprises a conveyor for feeding the pellet and an optical detector (preferably in the form of a CCD camera) that is arranged at a certain position adjacent to the conveyor track and that is connected to a control unit. This control unit is in turn functioning to analyse the signal generated by the detector, in such a way that any existing defective pellets can be sorted out This sorting-out is performed through there being, at the end of the conveyor, a first and a second container. The first container is positioned close to the end portion of the conveyor and the other container is positioned right behind the first container. As long as no defective pellets are detected, all pellets will simply successively fall into the first container, which is thus intended for faultless pellets. If, on the other hand, the control unit, with the aid of the signal from the detector, discovers a defect in a certain pellet, the control unit will then determine the position of this pellet. The control unit will then activate a separate sorting-out device in the form of an array of compressed air nozzles that are arranged below the conveyor, at the end portion thereof. If a defective pellet is discovered, a corresponding nozzle will be activated, through which a directed air jet is fed towards the pellet in question, just as it passes over the summit at the end of the conveyor. This will in turn entail that the pellet will be blown away somewhat and will land in the second container, which is thus intended for defective pellets.

If all the pellets in a manufacturing process for an insulating cable coating are checked regarding purity, this will consequently correspond to the raw material being cleansed to 100%, which creates conditions for an extremely high purity in the manufacture of an insulation coating for an electrical cable. A further advantage is that the sorted-out and defective pellets can be analysed, providing a possibility for deduction of the reason why they were contaminated.

Even though the above known method generally functions to satisfaction, it has some drawbacks. Primarily it should be noted that it has a limited capacity, i.e. it can only feed forward and analyse a certain, limited amount of pellet per unit of time.

Another disadvantage of the known system relates to the fact that the pellets passing over the top at the end of the conveyor without being sorted out, i.e. without being affected in the above discussed manner by an air jet, will follow a certain track or trajectory before falling down into the first container. Within this trajectory there is a certain scattering, entailing that a certain amount of faultless pellets will pass the first container in spite of being faultless, and will instead be falling into the second container.

Thus, a requirement exists for devices and methods for sorting of pellets, providing an increased capacity and an improved efficiency, i.e. a reduction of the amount of pellets that are sorted out in spite of being faultless.

DISCLOSURE OF INVENTION

The object of the present invention is to provide an improved device for sorting of pellets, which provides an increased capacity and efficiency. This object is achieved with a device, the characteristics of which are described in the appended claim 1. The invention also relates to a method for sorting pellets, the characteristics of which are described in the appended claim 7.

The invention comprises a transportation device for feeding the pellet, a first container for faultless pellets fed over the end portion of the transportation device, a second container for defective pellets, a detector for detecting of defective pellets and a sorting device for feeding the defective pellets to said second container. The invention is characterised in that the transportation device is arranged with an angle of inclination relative to the horizontal plane which is selected within a predetermined interval corresponding to a predetermined, limited scattering of the trajectory of the faultless pellets fed over the end portion of the transportation device.

According to a preferred embodiment of the invention, the transportation device consists of a vibration feeder. Furthermore, the invention preferably comprises a frequency sensor for measuring the vibration frequency of said vibration feeder, and a control unit functioning to operate the vibration feeder at a frequency adjusted to generally coincide with the mechanical resonance frequency thereof.

Through the invention, an even and controlled flow of pellet, and a high capacity of detection and sorting out of defective pellets, is achieved. A further advantage is that the sorted-out, contaminated pellets may be analysed at a high capacity, offering a possibility of tracing the reason why they were contaminated.

Advantageous embodiments of the invention are described in the appended, dependent claims.

BRIEF DESCRIPTION OF DRAWINGS

The invention will be explained in further detail below, with reference to a preferred embodiment example and the enclosed drawings, of which.

PREFERRED EMBODIMENT

Figure 1:
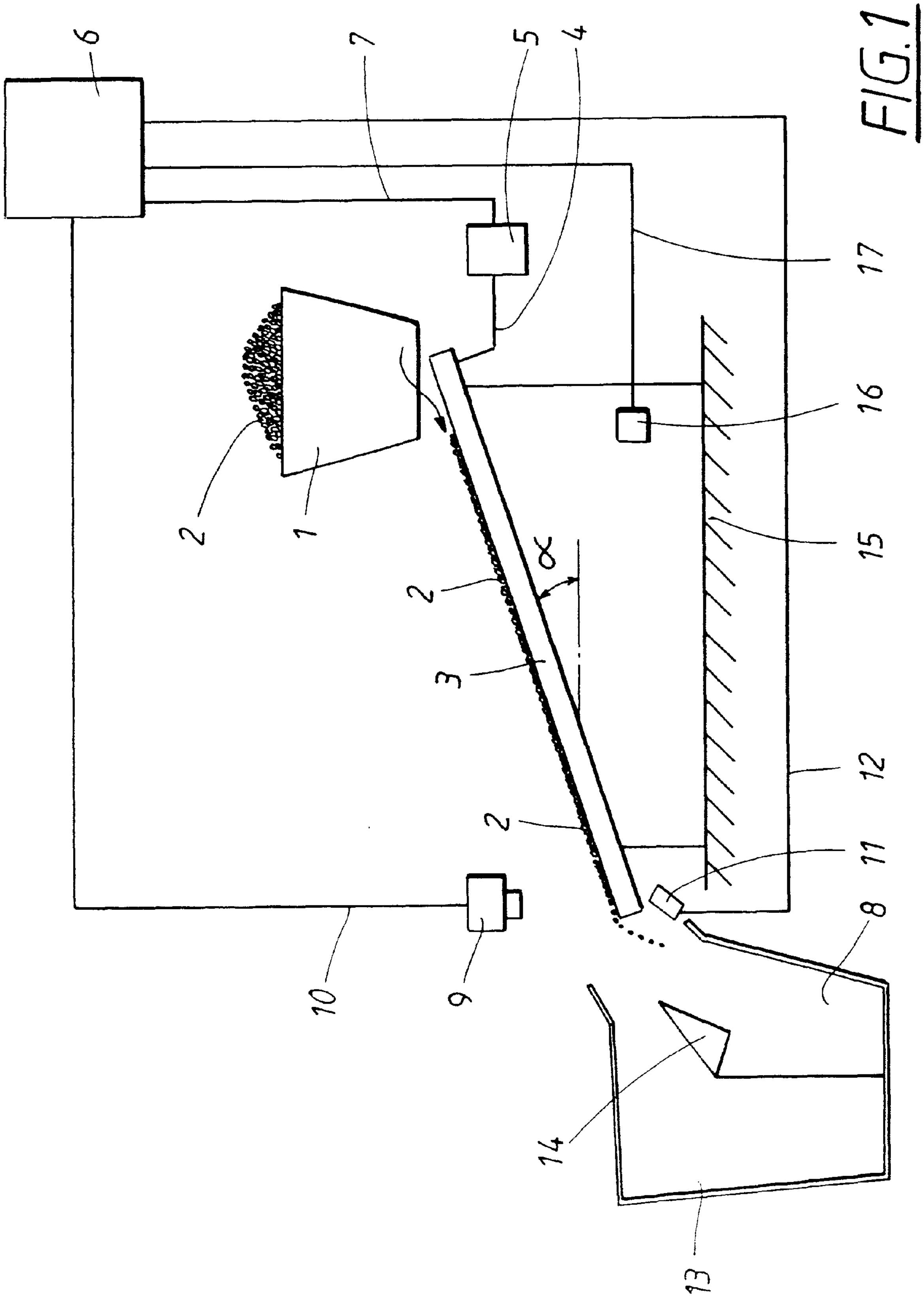
FIG. 1 shows a schematic elevational view of a device according to the invention.

FIG. 1 shows a schematic and somewhat simplified elevational view of a device according to the present invention. According to a preferred embodiment, the invention comprises a feeding device, preferably in the form of a container 1 for a certain amount of pellet 2, i.e. generally ball- or grain-shaped elements. The invention is particularly suitable for use in connection with the manufacture of electrical cables for high and medium high voltages (from about 50 kV upwards), whereby the pellet 2 consists of a raw material of polythene being used for manufacturing an electrically insulating coating for such cables.

The feeding device, i.e. the container 1, is connected to a transportation device 3 by means of a (not shown) opening in the bottom side of the container 1. The transportation device 3 is arranged for transporting pellet 2 in a direction indicated by an arrow in FIG. 1. According to the embodiment, the transportation device 3 consists of a vibration feeder, i.e. a vibrating chute, which transports the pellet forwards through vibrating to and fro in its longitudinal direction. For its operation, the vibration feeder 3 is connected, via an electrical connection 4, to a drive 5. This drive 5 comprises a voltage source that is functioning to provide an alternating current with a predetermined frequency. According to what will be described in detail below, this frequency can be tuned in dependence of the mechanical resonance frequency of the vibration feeder 3 in order to obtain optimum capacity (i.e. feeding speed) of the complete device. The drive 5 is in turn connected to an electronic control unit 6, by means of another electrical connection 7.

The pellet 2 is fed by the vibration feeder in the direction of the end portion 3 of the vibration feeder 3, at which a first container 8 is arranged for collecting the pellets falling over the crest constituted by the end portion of the vibration feeder 3.

Some distance above the vibration feeder 3, a detector 9 is arranged, preferably consisting of a CCD camera. With the aid of the detector 9, a scanning is performed, with the intention of detecting if any of the pellets passing below the detector 9 is defective, i.e. if any pellet contains e.g. a contamination particle, an air bubble or any non-homogeneity of the material. The detector 9 is connected to the control unit 6 via a further electrical connection 10. The control unit 6 is functioning to receive a signal from the detector 9, which signal is representative of the image read by means of the detector 9. In this way, the control unit can determine if any pellet passing below the detector 9 is defective.

The detector 9 is positioned a small distance inside the end portion of the vibration feeder 3, for scanning the pellets 2 just before they reach this end portion. If the control unit 6 determines that any passing pellet is defective, this will entail an activation of a particular sorting-out device 11 in the form of a transversal array of nozzles for emitting compressed air. This sorting-out device 11, which is connected to the control unit 6 by a further electrical connection 12, is arranged below the end of the vibration feeder 3, transversal to its longitudinal direction. According to what will be described in detail below, the control unit 6 can activate the sorting-out device 11 when the discovered defective pellet passes the crest at the end portion of the vibration feeder 3. This can be calculated in the control unit 6 in dependence of the position of the detector 9 and in dependence of the speed with which the vibration feeder 3 is transporting the pellet 2. As the detector 9 is also functioning to detect in what transversal position of the vibration feeder 3 the defective pellet is located, the sorting-out device 11 can be activated (i.e. a certain nozzle can be activated) exactly when the defective pellet is passing the crest at the end portion of the vibration feeder 3. This activation will cause a correspondingly located air valve of the sorting-out device 11 to be actuated, causing the defective pellet to be influenced by an air stream and be carried to a second container 13 which is intended for defective pellets. This second container 13 is located adjacent to the first container 8 and is separated therefrom by means of a partition wall 14.

Figure 2:
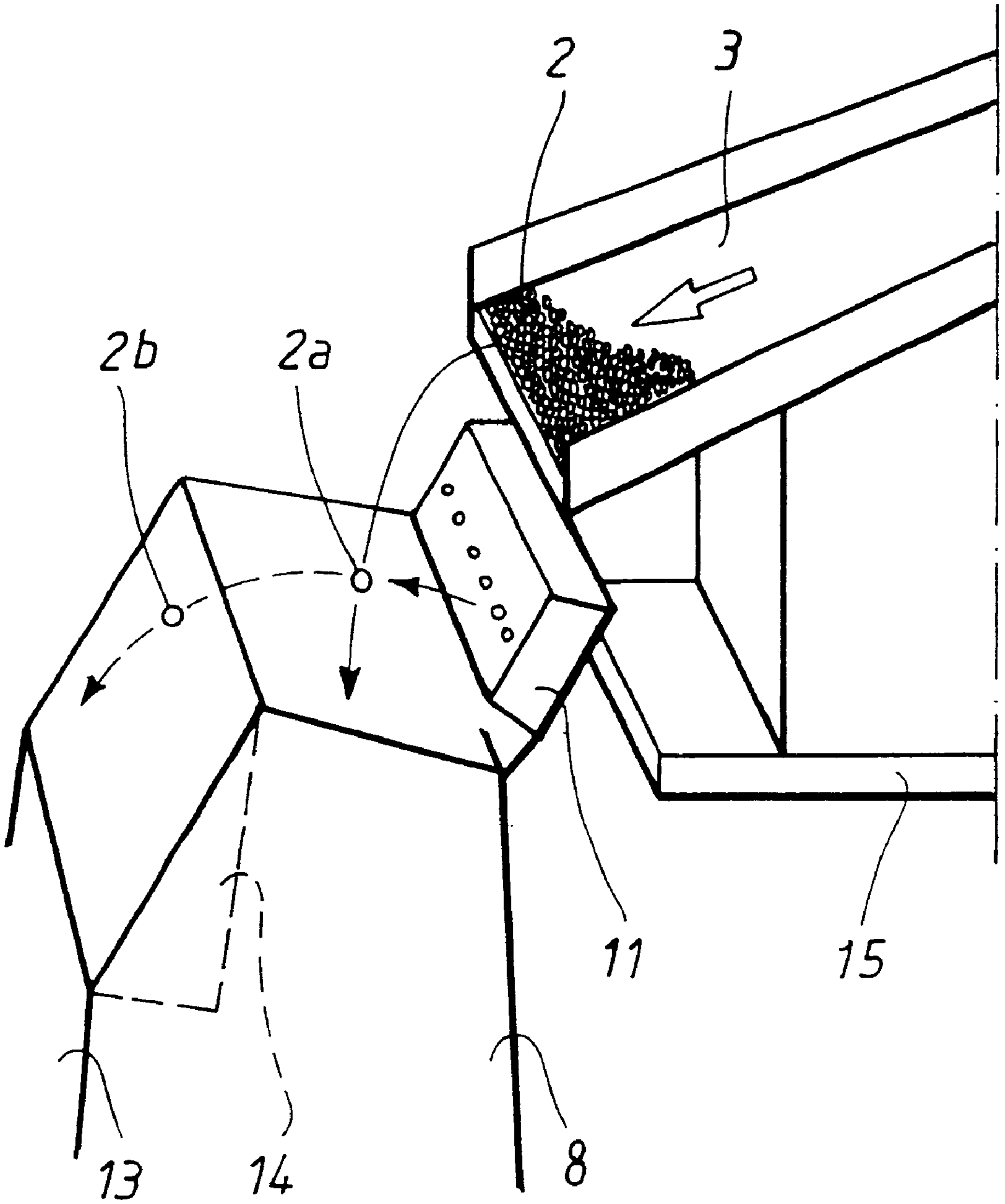
FIG. 2 shows a somewhat enlarged detail view, from which the function of the invention can be gathered.

Referring to FIG. 2, which is a somewhat enlarged perspective view, showing the end portion of the vibration feeder 3 and the sorting-out device 11, one can gather how the pellets 2 are fed in the direction of the crest formed at the end portion of the vibration feeder 3. This is schematically indicated by a first pellet 2*a* that is assumed to be faultless and that will thus fall down into the first container 8. Had the pellet instead been judged as being defective, the sorting-out device 11 would have been activated, in accordance with what has been described above, whereby air would have been fed through an air nozzle and in this way carried the pellet to the second container 13. This is schematically indicated at the reference number 2*b*.

According to what was discussed in the introduction, there is a problem in connection with previously known systems for sorting pellets, with high capacities, that an excessively large amount of faultless pellets are passing the partition wall and thus falling into the second container, in spite of actually being faultless. This phenomenon can be shown to be caused by the fact that the vibration feeder transfers a certain movement to the pellets, which, together with the force of gravity acting on the pellets just having passed the crest at the end portion of the vibration feeder, will give the pellets a certain trajectory. This trajectory will then vary to a relatively high degree for the respective pellet, and will thus exhibit a certain scattering, leading to the above phenomenon. The fact that the pellets passing the crest at the end of the vibration feeder exhibit a certain scattering in the curved trajectory they define, will then entail, statistically, that a certain fraction of faultless pellets will land in the wrong container even if no sorting-out device was activated. This problem is solved, according to the present invention, by arranging the vibration feeder 3 with an extension that is somewhat inclined with reference to the horizontal plane. According to what may be gathered particularly from FIG. 1, the vibration feeder 3 is arranged so as to form a certain angle a relative to the horizontal plane. The value of this angle a is selected within an interval that is primarily delimited by a maximum angle $\alpha_{max}$, which is defined as the angle where the pellet 2 becomes loose from the surface of the vibration feeder 3 and will thus accelerate freely along said surface without being retained by the friction against the vibration feeder 3. Preferably, the angle $\alpha$ is of the magnitude 10–20°, which corresponds to the movement transferred to the pellets (due to the movement and inclination of the vibration feeder 3) when passing the crest, substantially agreeing with their trajectory. This will in turn lead to less scattering of the trajectory. By arranging the vibration feeder 3 at said angle $\alpha$, a smaller scattering of the trajectory of the faultless pellets fed over the end portion of the vibration feeder 3 is achieved. This will reduce the risk of faultless pellets landing in the second container 13 and will thus increase the efficiency of the arrangement according to the invention, compared to previously known systems.

The value of the angle $\alpha$ is also delimited by a smallest angle $\alpha_{min}$, defined by an angle where a substantial decrease in scattering of the trajectory of the pellets passing the crest is achieved. Preferably, this smallest angle has a value just above 0°.

Furthermore, the invention is based upon attaining a high capacity at an even, controlled flow rate, through a precise adjustment of the frequency at which the vibration feeder 3 is operated. For this purpose, the vibration feeder is mounted onto a firm base 15, as can be gathered primarily from FIG. 1. More precisely, the vibration feeder is mounted on the base 15 via a resilient suspension, causing the vibration feeder to exhibit a certain mechanical resonance frequency in operation. The system according to the invention further comprises means for detecting the vibration frequency of the vibration feeder 3. Preferably, said means consist of a frequency sensor 16, provided in connection with the vibration feeder 3 and being connected to the control unit 6 via an electric connection 17.

Even if the drive 5 utilises a fixed network frequency as the basis for the vibration frequency of the vibration feeder 3, a problem could occur if the network frequency would vary, which is a common occurrence. For this reason, a basic principle of the invention is to utilise a representation of the actual vibration frequency of the vibration feeder 3 (which representation is provided by the frequency sensor 16) as a feedback for controlling the frequency of the actuating voltage from the drive 5. More precisely, the control unit 6 then controls the drive 5 with a frequency that substantially coincides with the current mechanical resonance frequency of the vibration feeder 3. The drive 5 is then functioning so as to substantially follow the frequency delivered by the frequency sensor 16 continuously, and to lock the drive frequency of the vibration feeder 3 onto that value. Also during any changes of the resonance frequency of the vibration feeder 3, for example occurring because of changes in temperature, the drive 5 will follow the measured frequency during operation of the vibration feeder 3. Preferably, the vibration feeder 3 is operated with a maximum deviation from the mechanical resonance frequency of about 1–2%. Through operating the vibration feeder 3 substantially at its exact mechanical resonance frequency, a high efficiency can be achieved without having to supply excess amounts of energy.

According to a further improved embodiment, the drive 5 can be controlled so as to use a voltage with a raised frequency, which corresponds to a reduced stroke of the vibration feeder 3, compared to the situation at the normal network frequency. Through this reduced stroke of vibration, a further advantage is achieved in the form of a controlled movement of the conveyed pellets 2, while at the same time obtaining an increased capacity. Preferably, a raised frequency of max 1 kHz is used for the invention.

The invention is not limited to the embodiments described above and shown in the drawings, but can be modified within the scope of the appended patent claims. For example, the invention could be used for detection and sorting of various kinds of pellet, not just polythene pellet intended for cable manufacture.

In principle, an increased capacity of a system according to the invention can be achieved by using an inclined vibration feeder 3, i.e. without controlling its frequency as per above, and vice versa.

The feeding device may in principle consist of a bowl or a corresponding container, or, alternatively, a separate conveyor belt for feeding the pellet.

Finally, the value of the frequency of the vibration feeder 3 may, as an alternative, be determined by detection of the phase difference between the current and voltage used for operating the vibration feeder 3.

What is claimed is:

1. An arrangement for sorting pellets, comprising:

a transportation device for feeding the pellets, a first container for faultless pellets fed over the end portion of the transportation device, a second container for defective pellets, a detector for detecting defective pellets and being positioned so as to scan the pellets fed along the transportation device before said pellets reach said end portion while they are still on the transport device, and a sorting-out device for feeding any defective pellets detected to said second container, wherein said transportation device is arranged with an angle of inclination ($\alpha$) relative to the horizontal plane which is selected within a predetermined interval corresponding to a predetermined, limited scattering of the trajectory of the pellets fed over the end portion of the transportation device, thus reducing the amount of pellets that are sorted out into said second container in spite of not being defective, wherein the movement which is transferred to said pellets by means of the transportation device substantially corresponds to said trajectory so as to provide an even and controlled flow rate for said pellets.

2. The arrangement according to claim 1, wherein said angle ($\alpha$) is selected at a value below a predetermined limit value ($\alpha_{max}$) corresponding to said pellet accelerating freely along said transportation device.

3. An arrangement according to claim 1, wherein said transportation device consists of a vibration feeder, wherein it comprises means for determining the vibration frequency of said vibration feeder and a control unit functioning for operation of the vibration feeder at a frequency tuned in dependence of said vibration frequency.

4. The arrangement according to claim 3, wherein said control unit is functioning for operation of the vibration feeder at a frequency substantially coinciding with the mechanical resonance frequency of the vibration feeder.

5. An arrangement according to claim 1, wherein said detector consists of an optical detector of the CCD type.

6. An arrangement according to claim 1, wherein the sorting-out device comprises a number of nozzles, through which compressed air is directed towards a found, defective pellet towards said second container.

7. An arrangement according to claim 6, wherein said sorting-out device is connected to a control unit which is arranged to calculate the transversal position of a defective pellet and thereby selectively activating a nozzle which is located in a position which corresponds to said defective pellet, thereby influencing said defective pellet to be carried to said second container.

8. An arrangement according to claim 1, wherein said pellets are constituted by ball or grain-shaped elements of polythene.

9. An arrangement according to claim 1, wherein said detector is arranged to detect at which transversal position a detected faulty pellet is located.

10. An arrangement according to claim 1, wherein said sorting-out device extends along essentially the entire width of the transportation device and is located below the end portion of the transportation device.

11. A method for sorting pellets, comprising:

feeding the pellets to a first container for faultless pellets and a second container for defective pellets, detecting defective pellets, scanning the pellets fed along the transportation device before said pellets reach said end portion while they are still on the transport device; and sorting the pellets by feeding detected defective pellets to said second container, wherein said feeding is performed via a transportation device, arranged with an angle of inclination ($\alpha$) in relation to the horizontal plane which is selected within a predetermined interval corresponding to a predetermined, limited scattering of the trajectory of the pellets fed over the end portion of the transportation device, thus reducing the amount of pellets that are sorted out into said second container in spite of not being defective, wherein the movement which is transferred to said pellets by means of the transportation device substantially corresponds to said trajectory so as to provide an even and controlled flow rate for said pellets.

12. The method according to claim 11, whereby said transportation device consists of a vibration feeder, comprising:

detecting the vibration frequency of said vibration feeder, and operating the vibration feeder at a frequency tuned in dependence of said vibration frequency.

13. The method according to claim 11, comprising selectively activating a nozzle forming part of a sorting-out device and being located in a position which corresponds to a detected, defective pellet, thereby influencing said defective pellet to be carried to said second container.

* * * * *